US011929013B2

(12) United States Patent
Jang et al.

(10) Patent No.: US 11,929,013 B2
(45) Date of Patent: Mar. 12, 2024

(54) DISPLAY DEVICE AND METHOD OF DRIVING THE SAME

(71) Applicant: Samsung Display Co., LTD., Yongin-si (KR)

(72) Inventors: Dae Gwang Jang, Yongin-si (KR); Jun Pyo Lee, Yongin-si (KR); Won Sik Oh, Yongin-si (KR); Jong Jae Lee, Yongin-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 0 days.

(21) Appl. No.: 17/740,951

(22) Filed: May 10, 2022

(65) Prior Publication Data

US 2023/0013528 A1 Jan. 19, 2023

(30) Foreign Application Priority Data

Jul. 19, 2021 (KR) ........................ 10-2021-0094444

(51) Int. Cl.

| | |
|---|---|
| ***H10K 50/00*** | (2023.01) |
| ***C09K 11/08*** | (2006.01) |
| ***G09G 3/14*** | (2006.01) |
| ***G09G 3/22*** | (2006.01) |
| ***G09G 3/32*** | (2016.01) |
| ***H05B 45/20*** | (2020.01) |
| ***H05B 45/44*** | (2020.01) |
| ***H10K 59/131*** | (2023.01) |

(52) U.S. Cl.
CPC ....... *G09G 3/32* (2013.01); *G09G 2300/0426* (2013.01); *G09G 2310/0275* (2013.01); *G09G 2310/08* (2013.01); *G09G 2320/0233* (2013.01)

(58) Field of Classification Search
CPC ......... G09G 3/32; G09G 3/2014–2074; G09G 2320/0242; G09G 2330/12
See application file for complete search history.

(56) References Cited

U.S. PATENT DOCUMENTS

| | | | | |
|---|---|---|---|---|
| 6,429,600 B1 * | 8/2002 | Fujita | G09G 3/14 345/204 |
| 6,894,465 B2 | 5/2005 | Sutardja et al. | |
| 7,213,940 B1 * | 5/2007 | Van De Ven | H05B 45/20 257/89 |
| 8,189,909 B2 | 5/2012 | Ok et al. | |

(Continued)

FOREIGN PATENT DOCUMENTS

| | | | |
|---|---|---|---|
| CN | 109841191 | * | 6/2019 |
| KR | 10-1144265 | | 5/2012 |
| KR | 10-1885824 | | 8/2018 |

*Primary Examiner* — Lin Li
(74) *Attorney, Agent, or Firm* — KILE PARK REED & HOUTTEMAN PLLC

(57) ABSTRACT

A display device according to an embodiment includes a pixel including a light emitting unit, a data driver that supplies a data voltage to the pixel, and a luminance corrector that corrects image data and generates compensation data corresponding to the data voltage. The light emitting unit includes at least one sub element group. The at least one sub element group includes light emitting elements. The luminance corrector extracts a deterioration value of the at least one sub element group and calculates a luminance value of the at least one sub element group according to a number of the light emitting elements included in the at least one sub element group.

18 Claims, 9 Drawing Sheets

(56) References Cited

U.S. PATENT DOCUMENTS

| | | | |
|---|---|---|---|
| 8,729,814 | B2 | 5/2014 | Salvestrini |
| 10,217,418 | B2 | 2/2019 | Kim et al. |
| 2012/0187854 | A1* | 7/2012 | Matsukura ............. H05B 45/44 315/192 |
| 2015/0041790 | A1* | 2/2015 | Lee ...................... H10K 59/131 257/40 |
| 2019/0081261 | A1* | 3/2019 | Lee ........................ C09K 11/08 |
| 2020/0312232 | A1* | 10/2020 | Yen .......................... G09G 3/32 |
| 2021/0201763 | A1* | 7/2021 | Kusunoki .............. H10K 50/00 |
| 2022/0051612 | A1* | 2/2022 | Nakanishi ................ G09G 3/22 |

* cited by examiner

| GRO | NUM | DET | LUMI |
|---|---|---|---|
| 1 | 3 | DET1 | LUMI1 |
| 2 | 4 | DET2 | LUMI2 |
| ⋮ | ⋮ | ⋮ | ⋮ |
| n | k | DETn | LUMIn |

| | PX1 | PX2 | PX3 | PX4 |
|---|---|---|---|---|
| GR01 (DET) | 9 | 15 | 12 | 12 |
| GR02 (DET) | 8 | 5 | 11 | 10 |
| GR03 (DET) | 7 | 5 | 10 | 8 |
| GR04 (DET) | 6 | 5 | 9 | 6 |
| DET_W | 7.7 | 10 | 10.7 | 9.4 |

DISPLAY DEVICE AND METHOD OF DRIVING THE SAME

CROSS-REFERENCE TO RELATED APPLICATION(S)

This application claims priority to and benefits of Korean Patent Application No. 10-2021-0094444 under 35 U.S.C. § 119, filed on Jul. 19, 2021, in the Korean Intellectual Property Office, the entire contents of which are incorporated herein by reference.

BACKGROUND

1. Technical Field

The disclosure relates to a display device and a method of driving the display device.

2. Description of the Related Art

As interest in information displays have been increasing and demand for using portable information media have been increasing, there has also been a demand for display devices a demand and efforts have been focused on commercialization of display devices.

SUMMARY

An object of the disclosure is to provide a display device capable of implementing a uniform luminance on a display device, and a method of driving such a display device.

According to an embodiment of the disclosure, a display device may include a pixel including a light emitting unit, a data driver that supplies a data voltage to the pixel, and a luminance corrector that corrects image data and generates compensation data corresponding to the data voltage. The light emitting unit may include at least one sub element group. The at least one sub element group may include light emitting elements. The luminance corrector may extract a deterioration value of the at least one sub element group and may calculate a luminance value of the at least one sub element group according to a number of the light emitting elements included in the at least one sub element group.

The luminance corrector may extract the deterioration value of the at least one sub element group according to a sub driving current applied to the light emitting elements. The sub driving current may be obtained by dividing a driving current applied to the light emitting unit by the number of the light emitting elements included in the at least one sub element group. The luminance corrector may calculate the luminance value of the at least one sub element group by applying the deterioration value of the at least one sub element group.

The luminance corrector may calculate a current luminance value of the pixel by summing the luminance value of each of the at least one sub element group. The luminance corrector may calculate a correction luminance value by comparing the current luminance value with a reference luminance value.

The luminance corrector may extract a deterioration weight according to magnitudes of the deterioration value of the at least one sub group and a distribution of the deterioration value of the at least one sub group, and may apply the deterioration weight to the current luminance value.

The luminance corrector may generate the compensation data by applying the correction luminance value to the image data.

The display device may further include a timing controller that supplies the image data to the luminance corrector. An externally supplied image signal may be rearranged in the image data. The luminance corrector may supply the compensation data to the data driver.

The pixel may include a first transistor, a second transistor, and a third transistor. The first transistor may include a first electrode electrically connected to a first power line, a second electrode electrically connected to a first electrode of the light emitting unit, and a gate electrode electrically connected to a first node. The second transistor may include a first electrode electrically connected to a data line, a second electrode electrically connected to the first node, and a gate electrode electrically connected to a first scan line. The third transistor may include a first electrode electrically connected to a sensing line, a second electrode electrically connected to a second electrode of the first transistor, and a gate electrode electrically connected to a second scan line. The first transistor may control a value of the driving current flowing to the light emitting unit in response to a voltage of the first node.

Light emitting elements included in the at least one sub element group may be electrically connected in parallel, and the at least one sub element group may include a first sub element group and a second sub element group electrically connected in series.

A number of the light emitting elements of the first sub element group and a number of the light emitting elements of the second sub element group may be different. A value of a sub driving current applied to the light emitting elements of the first sub element group and a value of a sub driving current applied to the light emitting elements of the second sub element group may be different.

In case that the number of the light emitting elements of the first sub element group is less than the number of the light emitting elements of the second sub element group, the value of the sub driving current applied to the light emitting elements of the first sub element group may be greater than the value of the sub driving current applied to the light emitting elements of the second sub element group.

According to an embodiment, a display device may include a pixel, a light element number obtainer, deterioration value extractor, a luminance value calculator, a correction luminance calculator, and a corrector. The pixel may include a light emitting unit including a sub element groups, each sub element group including light emitting elements. The light emitting element number obtainer may obtain a number of light emitting elements of each of the sub element groups. The deterioration value extractor may extract deterioration values of the sub element groups according to sub driving currents applied to the light emitting elements, and the sub driving currents may be obtained by dividing a driving current applied to the light emitting unit by the number of the light emitting elements. The luminance value calculator may calculate luminance values of the sub element groups by applying the deterioration values. The correction luminance calculator may calculate a current luminance value of the pixel by summing the luminance values, and may calculate a correction luminance value by comparing the current luminance value with a reference luminance value. The corrector may generate compensation data by applying the correction luminance value to image data.

The display device may further include a data driver that supplies a data voltage to the pixel and a timing controller that supplies the image data to the corrector. An externally supplied image signal may be rearranged in the image data. The corrector may supply the compensation data to the data driver.

The light emitting element number obtainer may obtain the number of the light emitting elements of each of the sub element groups by at least one of optical imaging, thermal imaging, and pixel sensing.

The correction luminance calculator may extract a deterioration weight according to magnitudes of the deterioration values of the sub element groups and a distribution of the deterioration values of the sub element groups, and may apply the deterioration weight to the current luminance value.

The correction luminance calculator may calculate the correction luminance value by considering a change in an efficiency of the light emitting elements of the sub element groups over time.

According to an embodiment, a method of driving a display device comprising a pixel including sub element groups each including light emitting elements may include obtaining a number of the light emitting elements of each of sub element groups, extracting deterioration values of the sub element groups, calculating a luminance values of the sub element groups by applying the deterioration values, calculating a current luminance value of the pixel by summing the luminance values, and calculating a correction luminance value by comparing the current luminance value with a reference luminance value.

The obtaining of a number of the light emitting elements of each of the sub element groups may include at least one of optical imaging, thermal imaging, and pixel sensing.

The calculating of the current luminance value of the pixel may include extracting a deterioration weight according to magnitudes and a distribution of the deterioration values of sub element groups, and applying the deterioration weight to the current luminance value.

The calculating of the correction luminance value may include considering a change in efficiency of the light emitting elements over time.

The method may further include generating compensation data by applying the correction luminance value to image data. An externally supplied image signal may be rearranged in the image data.

According to an embodiment, since a luminance of pixels is corrected according to a deterioration degree based on the number of light emitting elements of each of the sub element groups, the luminance of a display device may be uniformly maintained.

Effects of the embodiments are not limited to those above, and other effects may be included in the specification.

BRIEF DESCRIPTION OF THE DRAWINGS

The above and other features of the disclosure will become more apparent by describing in further detail embodiments thereof with reference to the accompanying drawings, in which.

DETAILED DESCRIPTION OF THE EMBODIMENTS

Figure 1:
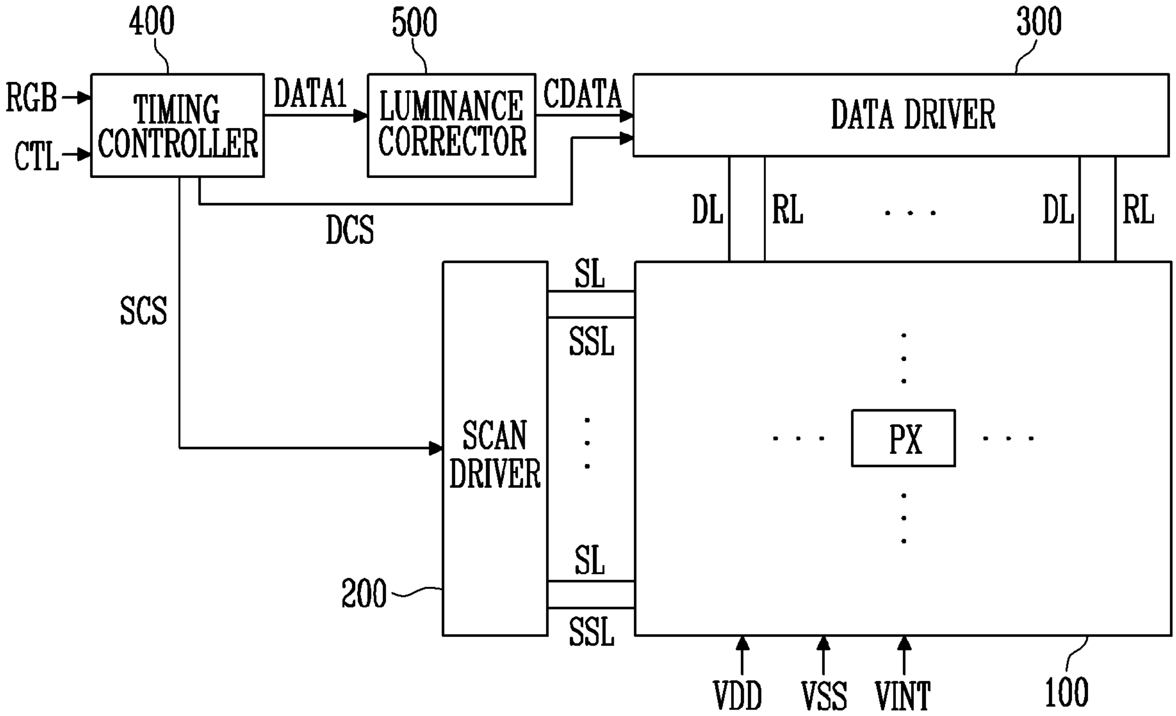
FIG. 1 is a block diagram illustrating a display device according to an embodiment.

The disclosure will now be described more fully hereinafter with reference to the accompanying drawings, in which embodiments are shown. This disclosure may, however, be embodied in different forms and should not be construed as limited to the embodiments set forth herein. Rather, these embodiments are provided so that this disclosure will be thorough and complete, and will fully convey the scope of the disclosure to those skilled in the art. The disclosure may be modified in various manners and have various forms. Therefore, embodiments will be illustrated in the drawings and will be described in detail in the specification. It should be understood that the disclosure is not intended to be limited to the disclosed forms, and the disclosure includes all modifications, equivalents, and substitutions within the spirit and technical scope of the disclosure.

Terms of “first,” “second,” and the like may be used to describe various components, but the components should not be limited by the terms. The terms are used only for the purpose of distinguishing one component from another component. For example, without departing from the scope of the disclosure, a first component may be referred to as a second component, and similarly, a second component may also be referred to as a first component. The singular expressions include plural expressions unless the context clearly indicates otherwise.

It should be understood that in the specifications, the terms “include,” “have,” or the like are used to specify that there is a feature, a number, a step, an operation, a component, a part, or a combination thereof described in the specification, but does not exclude a possibility of the presence or addition of one or more other features, numbers, steps, operations, components, parts, or combinations thereof.

As used herein, the singular forms, “a,” “an,” and “the” are intended to include the plural forms as well, unless the context clearly indicates otherwise.

n the specification and the claims, the term “and/or” is intended to include any combination of the terms “and” and “or” for the purpose of its meaning and interpretation. For example, “A and/or B” may be understood to mean “A, B, or A and B.” The terms “and” and “or” may be used in the conjunctive or disjunctive sense and may be understood to be equivalent to “and/or.”

In the specification and the claims, the phrase “at least one of” is intended to include the meaning of “at least one selected from the group of” for the purpose of its meaning and interpretation. For example, “at least one of A and B” may be understood to mean “A, B, or A and B.”

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" may mean within one or more standard deviations, or within ±30%, 20%, 10%, 5% of the stated value.

It will be understood that when an element (or a region, a layer, a portion, or the like) is referred to as "being on," "connected to," or "coupled to" another element in the specification, it can be directly disposed on, connected or coupled to another element mentioned above, or intervening elements may be disposed therebetween.

It will be understood that the terms "connected to" or "coupled to" may include a physical or electrical connection or coupling.

Embodiments may be described and illustrated in the accompanying drawings in terms of functional blocks, units, and/or modules. Those skilled in the art will appreciate that these blocks, units, and/or modules are physically implemented by electronic (or optical) circuits, such as logic circuits, discrete components, microprocessors, hard-wired circuits, memory elements, wiring connections, and the like, which may be formed using semiconductor-based fabrication techniques or other manufacturing technologies.

In the case of the blocks, units, and/or modules being implemented by microprocessors or other similar hardware, they may be programmed and controlled using software (for example, microcode) to perform various functions discussed herein and may optionally be driven by firmware and/or software. It is also contemplated that each block, unit, and/or module may be implemented by dedicated hardware, or as a combination of dedicated hardware to perform some functions and a processor (for example, one or more programmed microprocessors and associated circuitry) to perform other functions.

Each block, unit, and/or module of embodiments may be physically separated into two or more interacting and discrete blocks, units, and/or modules without departing from the scope of the disclosure. Further, the blocks, units, and/or modules of embodiments may be physically combined into more complex blocks, units, and/or modules without departing from the scope of the disclosure.

Hereinafter, a display device according to an embodiment of the disclosure is described with reference to drawings related to embodiments of the disclosure.

FIG. 1 is a block diagram illustrating a display device according to an embodiment.

Referring to FIG. 1, the display device according to an embodiment may include a pixel unit 100, a scan driver 200, a data driver 300, a timing controller 400, and a luminance corrector 500.

The display device may be a flat display device, a flexible display device, a curved display device, a foldable display device, a bendable display device, or a stretchable display device. The display device may be applied to a transparent display device, a head-mounted display device, a wearable display device, and the like. The display device may be applied to various electronic devices such as a smart phone, a tablet, a smart pad, a TV, and a monitor.

The display device may be implemented as a self-emission display device including self-emission elements. For example, the display device may be an organic light emitting display device including organic light emitting elements, a display device including inorganic light emitting elements, or a display device including light emitting elements configured of an inorganic material and an organic material in combination. However, the embodiments are not limited thereto, and the display device may also be implemented as a liquid crystal display device, a plasma display device, a quantum dot display device, or the like.

The pixel unit 100 includes a pixel PX electrically connected to a data line DL, a first scan line SL, a second scan line SSL, and a sensing line RL. The pixel unit 100 may include pixels PX respectively electrically connected to data lines DL, first scan lines SL, second scan lines SSL, and sensing lines RL.

The pixel PX may receive a first driving voltage VDD, a second driving voltage VSS, and an initialization voltage VINT from an outside. A configuration of the pixel PX is described with reference to FIGS. 2 and 3.

In FIG. 1, the first scan line SL and the second scan line SSL may be electrically connected to the pixel PX, but the disclosure is not limited thereto. According to an embodiment, one or more emission control lines may be additionally formed in the pixel unit 100 depending on the circuit structure of the pixel PX.

The scan driver 200 may receive a scan control signal SCS from the timing controller 400. The scan driver 200 may supply a first scan signal to each of the first scan lines SL and supply a second scan signal to each of the second scan lines SSL in response to the scan control signal SCS.

The scan driver 200 may sequentially supply the first scan signal to the first scan lines SL. For example, the first scan signal may be set to a gate-on voltage so that a transistor included in the pixel PX is turned on. The first scan signal may be used to apply a data signal (or a data voltage) to the pixel PX.

The scan driver 200 may supply the second scan signal to the second scan lines SSL. For example, the second scan signal may be set to a gate-on voltage so that the transistor included in the pixel PX is turned on. The second scan signal may be used to sense (or extract) a driving current flowing through the pixel PX or apply the initialization voltage VINT to the pixel PX.

In FIG. 1, one scan driver 200 may output both of the first scan signal and the second scan signal, but the disclosure is not limited thereto. According to an embodiment, the scan driver 200 may include a first scan driver that supplies the first scan signal to the pixel unit 100 and a second scan driver that supplies the second scan signal to the pixel unit 100. The first scan driver and the second scan driver may be implemented as separate configurations.

The data driver 300 receives a data control signal DCS from the timing controller 400. The data driver 300 receives compensation data CDATA from the luminance corrector 500. The data driver 300 may generate data voltages (or data signals) in response to the data control signal DCS and the compensation data CDATA, and supply the generated data voltages to the data lines DL, respectively. The data driver 300 may supply the data voltage to the pixel unit 100 during a display period of each of the pixels PX during a frame period.

The data driver 300 may generate a data voltage (or a data signal) corresponding to a data value (or a grayscale value) included in the compensation data CDATA by using gamma voltages. Here, the gamma voltages may be generated by the data driver 300 or provided from a separate gamma voltage generation circuit (for example, a gamma integrated circuit). For example, the data driver 300 may select one of the gamma voltages based on the data value included in the compensation data CDATA and output the selected gamma voltage as the data voltage (or the data signal).

The data driver 300 may supply the initialization voltage VINT to the sensing lines RL during the display period. The data driver 300 may apply the initialization voltage VINT to the sensing lines RL in a sensing mode (or a sensing period), and then sense a light emission characteristic of each pixel PX through the sensing lines RL. The light emission characteristics of the pixel PX may include a threshold voltage of at least one transistor (for example, a driving transistor) in the pixel PX, mobility, and characteristics information (for example, a current-voltage characteristic) of a light emitting element.

In an embodiment, the sensing lines RL may be electrically connected to the data driver 300. In other examples, a separate sensing unit may be provided in the display device, and the data driver 300 and the sensing unit may be implemented as separate configurations.

The timing controller 400 may receive a timing control signal CTL and an image signal RGB from an image source such as an external graphic device.

The timing controller 400 may generate the data control signal DCS and the scan control signal SCS in response to the timing control signal CTL supplied externally. The data control signal DCS generated by the timing controller 400 may be supplied to the data driver 300, and the scan control signal SCS may be supplied to the scan driver 200.

The timing controller 400 may supply image data DATA1, in which the externally supplied image signal RGB is rearranged, to the luminance corrector 500.

The luminance corrector 500 may calculate a deterioration value and a luminance value according to the number of light emitting elements of at least one sub element group included in the pixel PX, correct the image data DATA1 of the at least one sub element group, and generate compensation data CDATA. The luminance corrector 500 may receive the image data DATA1 from the timing controller 400, and may supply the generated compensation data CDATA to the data driver 300. Details regarding the luminance corrector 500 are described in detail in FIG. 4, below.

In FIG. 1, the scan driver 200, the data driver 300, the timing controller 400, and the luminance corrector 500 are configured independently of each other, but the disclosure is not limited thereto. For example, at least one of the scan driver 200, the data driver 300, the timing controller 400, and the luminance corrector 500 may be provided in the pixel unit 100, or may be implemented as an integrated circuit, may be mounted on a flexible circuit board, and may be electrically connected to the pixel unit 100. For example, the scan driver 200 may be provided in the pixel unit 100. At least two of the scan driver 200, the data driver 300, the timing controller 400, and the luminance corrector 500 may be implemented as a single integrated circuit. For example, the data driver 300 and the luminance corrector 500 may be implemented as an integrated circuit, and the timing controller 400 and the luminance corrector 500 may be implemented as another integrated circuit.

Hereinafter, a pixel of a display device according to an embodiment is described with reference to FIGS. 2 and 3.

Figure 2:
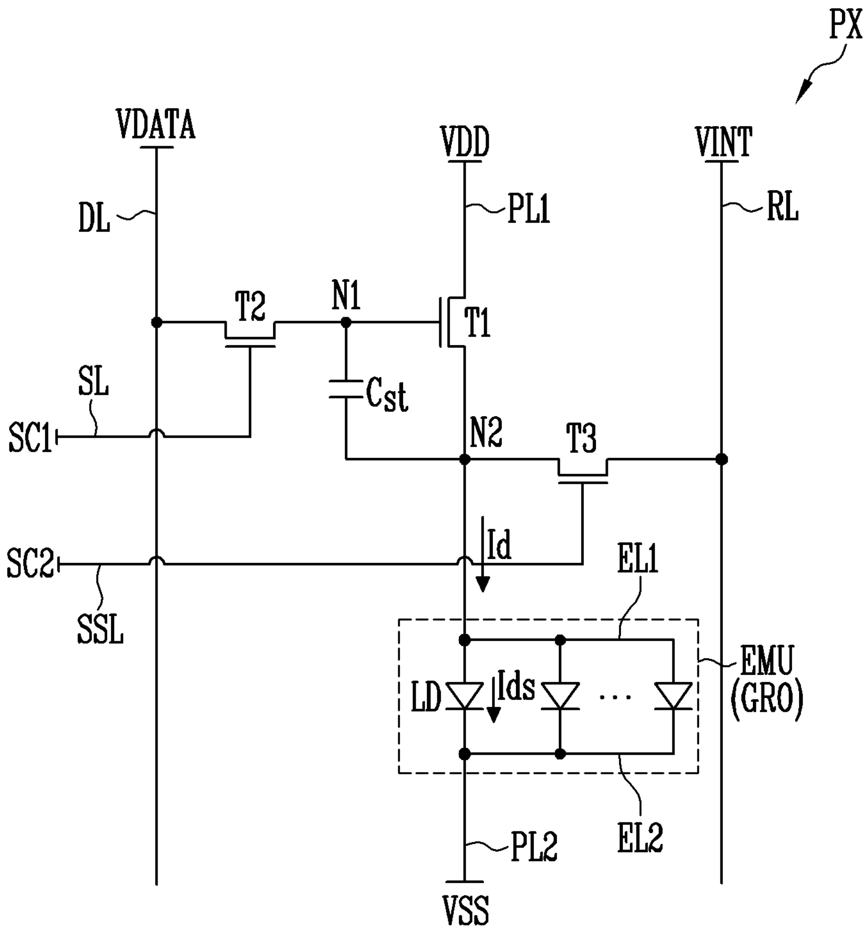
FIGS. 2 and 3 are schematic diagrams of equivalent circuits illustrating examples of the pixel included in the display device of FIG. 1.
Figure 3:
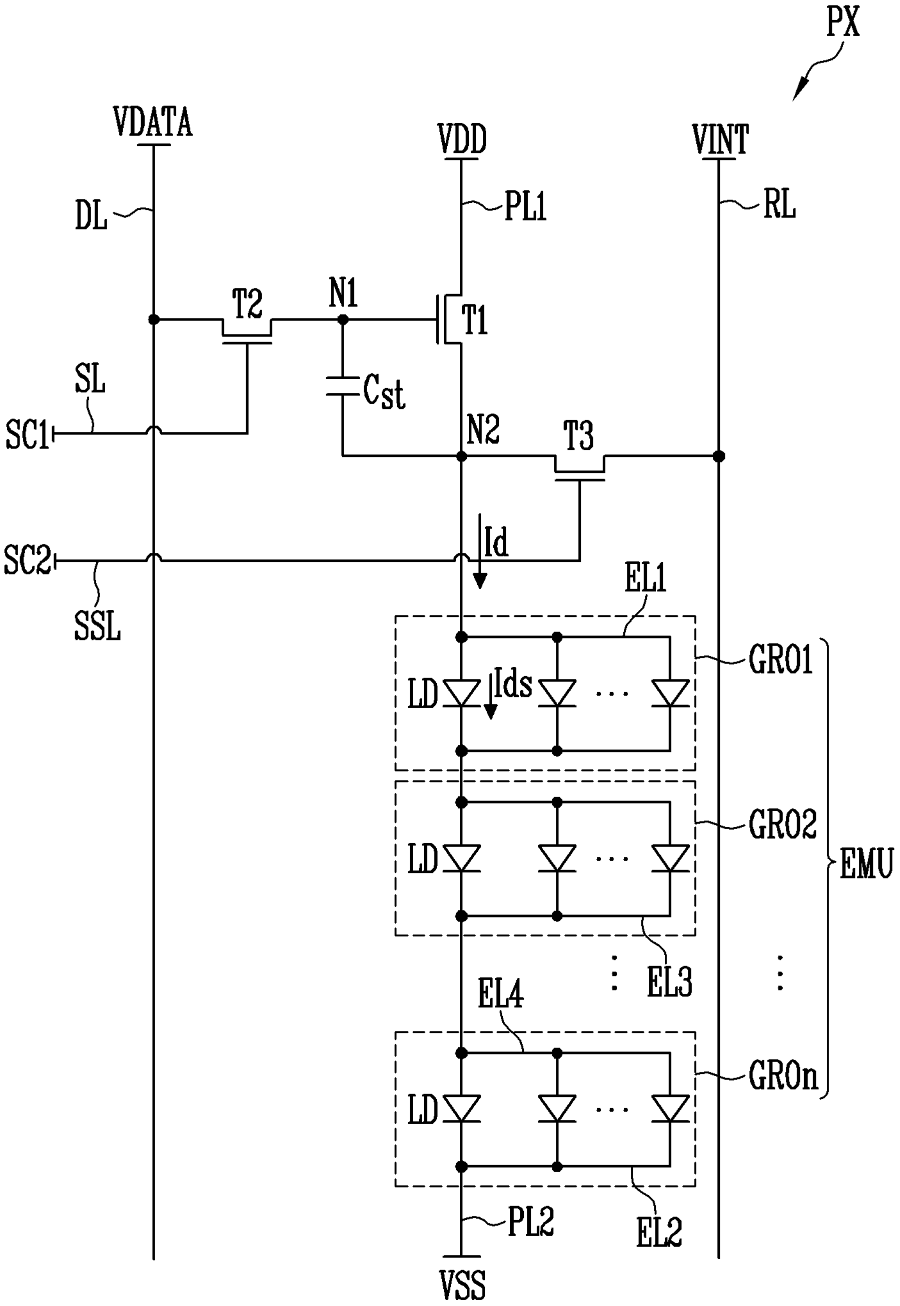

FIGS. 2 and 3 are schematic diagrams of equivalent circuits illustrating examples of the pixel included in the display device of FIG. 1.

Referring to FIGS. 2 and 3, the pixel PX may include a first transistor T1, a second transistor T2, a third transistor T3, a storage capacitor Cst, and a light emitting unit EMU.

A first electrode of the first transistor T1 (or a driving transistor) may be electrically connected to a first power line PL1, and a second electrode may be electrically connected to a first electrode EL1 (or a second node N2) of the light emitting unit EMU. A gate electrode of the first transistor T1 may be electrically connected to a first node N1. In an embodiment, the first electrode may be a drain electrode, and the second electrode may be a source electrode. The first transistor T1 may control the amount of a driving current Id flowing to the light emitting unit EMU in response to a voltage of the first node N1.

A first electrode of the second transistor T2 (or a switching transistor) may be electrically connected to the data line DL, and a second electrode may be electrically connected to the first node N1 (or the gate electrode of the first transistor T1). A gate electrode of the second transistor T2 may be electrically connected to the first scan line SL. The second transistor T2 may be turned on when the first scan signal SC1 (for example, a high level voltage) is supplied to the first scan line SL, to transmit the data voltage VDATA from the data line DL to the first node N1.

A first electrode of the third transistor T3 may be electrically connected to the sensing line RL, and a second electrode may be electrically connected to the second node N2 (or the second electrode of the first transistor T1). A gate electrode of the third transistor T3 may be electrically connected to the second scan line SSL. The third transistor T3 may be turned on when the second scan signal SC2 (for example, a high level voltage) is supplied to the second scan line SSL during a sensing period, to electrically connect the sensing line RL and the second node N2.

The storage capacitor Cst is electrically connected between the first node N1 and the second node N2. The storage capacitor Cst may charge the data voltage VDATA corresponding to the data signal supplied to the first node N1 during a frame. Accordingly, the storage capacitor Cst may store a voltage corresponding to a voltage difference between the first node N1 and the second node N2. For example, the storage capacitor Cst may store a voltage corresponding to a difference between the data voltage VDATA supplied to the gate electrode of the first transistor T1 and the initialization voltage VINT supplied to the second electrode of the first transistor T1.

The light emitting unit EMU may include light emitting elements LD electrically connected in series and/or in parallel between the first power line PL1 to which the first driving voltage VDD is applied and a second power line PL2 to which the second driving voltage VSS is applied.

For example, the light emitting unit EMU with reference to FIG. 2 may include light emitting elements LD electrically connected in parallel, and the light emitting unit EMU with reference to FIG. 3 may include light emitting elements LD electrically connected in series and in parallel. Among the light emitting elements LD electrically connected in parallel, each of the light emitting elements LD electrically connected in the same direction may configure an effective light source. The light emitting elements LD electrically connected in parallel in the same direction may comprise one sub element group GRO.

The light emitting unit EMU may include at least one sub element group GRO. The sub element groups GRO may be electrically connected in series in the light emitting unit EMU. For example, the light emitting unit EMU of FIG. 3 may include a first sub element group GRO1, a second sub element group GRO2, up to an n-th sub element group GROn electrically connected between the second node N2 and the second power line PL2.

The light emitting unit EMU may include at least one sub element group GRO electrically connected in series between a first electrode EL1 electrically connected to the second node N2 and a second electrode EL2 electrically connected to the second power line PL2. Here, the first electrode EL1 may be an anode, and the second electrode EL2 may be a cathode. Referring to FIG. 3, a third electrode EL3 may be a cathode, and a fourth electrode EL4 may be an anode.

The second sub element group GRO2 may include light emitting elements LD electrically connected in the same direction between the first electrode EL1 and the third electrode EL3. The n-th sub element group GROn may include light emitting elements LD electrically connected in the same direction between the fourth electrode EL4 and the second electrode EL2.

The numbers of light emitting elements LD included in each of the first sub element group GRO1 and the second sub element group GRO2 to the n-th sub element group GROn may be different. For example, the first sub element group GRO1 may include three light emitting elements LD, the second sub element group GRO2 may include four light emitting elements LD, and the n-th sub element group GROn may include k light emitting elements LD. According to the number of light emitting elements LD in each sub element group GRO, the value of the current flowing through the light emitting element LD of each sub element group, the luminance of each sub element group GRO, and the deterioration degree of each sub element group GRO may be different. In an embodiment, by correcting the luminance of the pixels PX with respect to the deterioration degree according to the number of light emitting elements of each sub element group GRO, the luminance of the display device may be maintained to be uniform.

The light emitting unit EMU may generate light of a selected luminance in response to the driving current Id supplied from the first transistor T1. For example, during one frame period, the first transistor T1 may supply a driving current Id to the light emitting unit. The driving current Id may correspond to a grayscale value of the frame data (for example, the compensation data CDATA, refer to FIG. 1). The driving current Id supplied to the light emitting unit EMU may be divided and may flow through the light emitting elements LD. Here, the current divided and flowing through the light emitting elements LD may be referred to as a sub driving current Ids. While each light emitting element LD emits light with a luminance corresponding to the sub driving current Ids, the light emitting unit EMU may emit light of the luminance corresponding to the driving current Id.

The sub driving current Ids may vary according to the number of light emitting elements LD of the sub element group GRO. For example, when the number of light emitting elements LD of the first sub element group GRO1 is less than the number of light emitting elements LD of the second sub element group GRO2, a value of the sub driving current Ids flowing through the light emitting element LD of the first sub element group GRO1 may be greater than a value of the sub driving current Ids flowing through the light emitting element LD of the second sub element group GRO2. Accordingly, the luminance of each sub element group GRO and the deterioration degree of each sub element group GRO may be different, and a luminance deviation of the pixels PX including the sub element group GRO may occur. In an embodiment, since the luminance of the pixels PX with respect to the deterioration degree of each sub element group GRO, according to the number of light emitting elements of each of the sub element groups GRO, the luminance of the display device may be maintained to be uniform.

Hereinafter, a luminance corrector according to an embodiment is described with reference to FIGS. 4 to 11.

Figure 4:
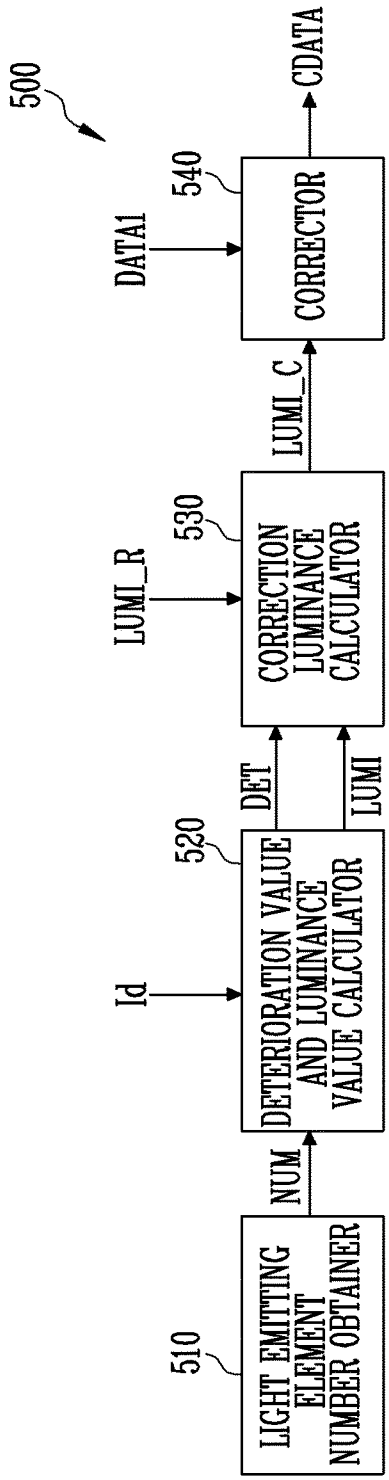
FIGS. 4 and 5 are block diagrams illustrating an example of a luminance corrector according to an embodiment.
Figure 5:
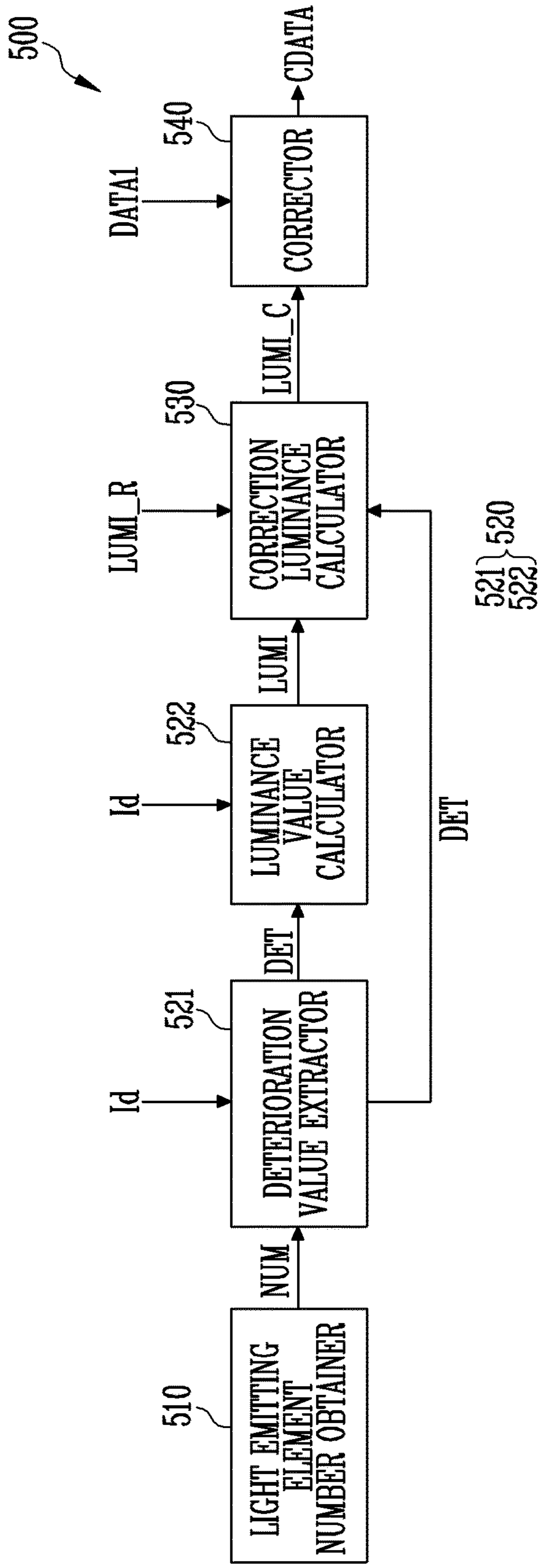
Figures 6, 7:
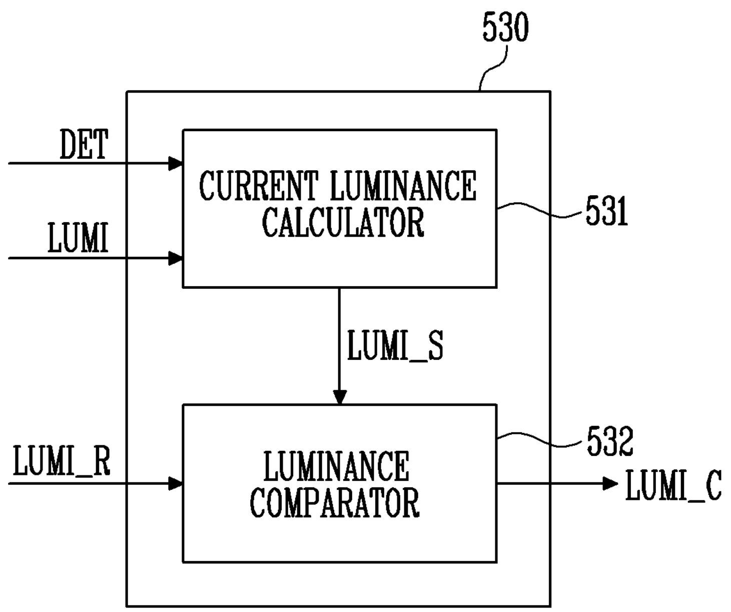
FIG. 6 is a table illustrating a deterioration value extractor and a luminance value calculator according to an embodiment.
FIG. 7 is a block diagram illustrating a correction luminance calculator according to an embodiment.
Figures 8, 9:
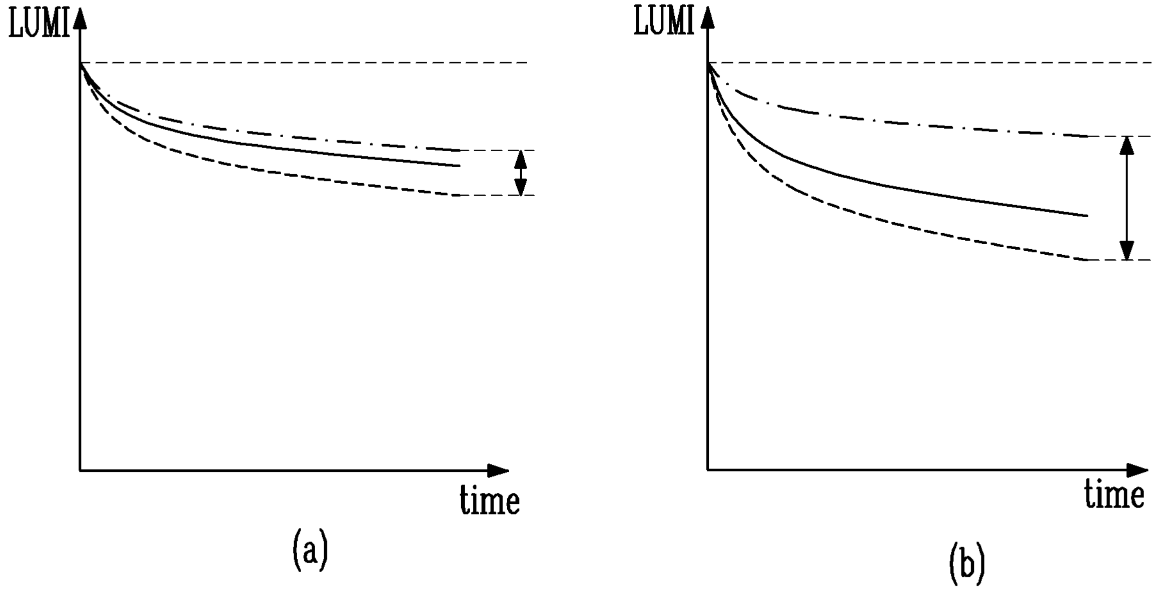
FIGS. 8 and 9 are tables and graphs illustrating a current luminance calculator according to an embodiment.
Figure 10:
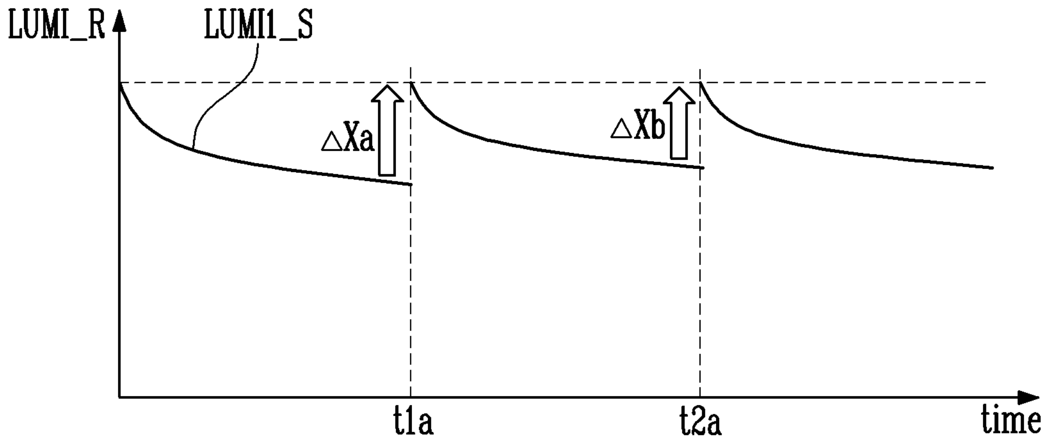
FIGS. 10 and 11 are graphs illustrating a correction luminance calculator according to an embodiment.
Figure 11:
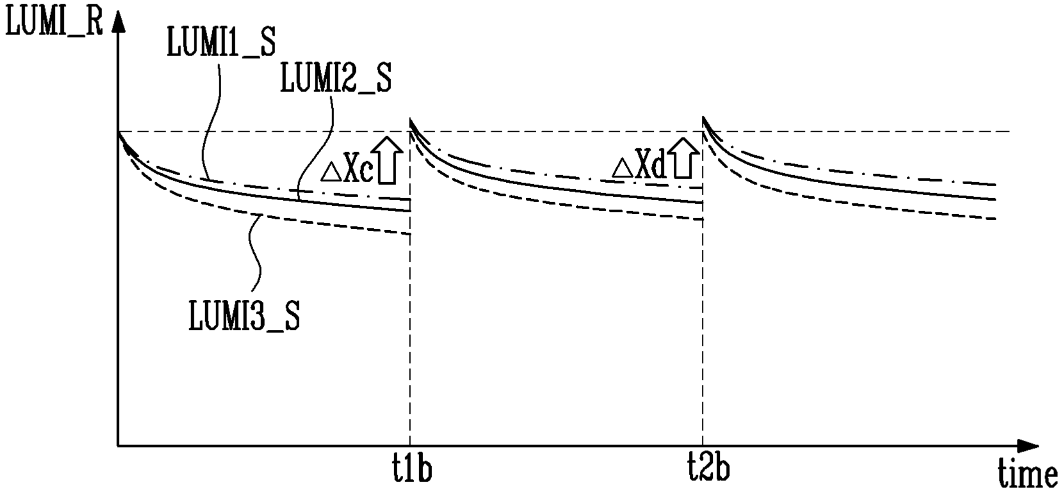

FIGS. 4 and 5 are block diagrams illustrating an example of a luminance corrector according to an embodiment. FIG. 6 is a table illustrating a deterioration value extractor and a luminance value calculator according to an embodiment. FIG. 7 is a block diagram illustrating a correction luminance calculator according to an embodiment. FIGS. 8 and 9 are tables and graphs illustrating a current luminance calculator according to an embodiment. FIGS. 10 and 11 are graphs illustrating a correction luminance calculator according to an embodiment.

Referring to FIGS. 4, 5, and 7, the luminance corrector 500 may include a light emitting element number obtainer 510, a deterioration value and luminance value calculator 520, a correction luminance calculator 530, and a corrector 540. Hereinafter, the disclosure is described with reference to FIGS. 1 to 3 together.

The light emitting element number obtainer 510 may obtain the number NUM of each light emitting element in the sub element groups GRO of each pixel PX (or light emitting unit EMU).

For example, referring to FIG. 3, the light emitting element number obtainer 510 may detect that the number NUM of light emitting elements included in the first sub element group GRO1 is three and the number NUM of light emitting elements included in the second sub element group GRO2 is four.

The NUM number of light emitting elements may be obtained by optical imaging, thermal imaging, pixel sensing, or the like. The light emitting element number obtainer 510 may obtain the number NUM of light emitting elements included in the sub element groups GRO by imaging the pixel unit 100 (refer to FIG. 1) through an optical camera, a thermal imaging camera, or the like. In case that a pixel PX includes a single sub element group GRO, the light emitting element number obtainer 510 may obtain the number NUM of light emitting elements by comparing a sensing value of the second node N2 through the third transistor T3 with a characteristic curve of the light emitting element LD.

The deterioration value and luminance value calculator 520 may receive the obtained number NUM of light emitting elements of the sub element groups GRO from the light emitting element number obtainer 510, and calculate a deterioration value DET and a luminance value LUMI according to the number NUM of light emitting elements in each of the sub element groups GRO based on the driving current Id applied to the light emitting unit EMU.

The deterioration value and luminance value calculator 520 includes a deterioration value extractor 521 and a luminance value calculator 522.

The deterioration value extractor 521 may extract the deterioration value of the sub element group GRO according to the sub driving current Ids applied to each light emitting element LD of the sub element group GRO. The sub driving current Ids may be obtained by dividing the driving current Id applied to the light emitting unit EMU by the number of the light emitting elements. The deterioration value DET of the sub element group GRO may be extracted by comparing the value of the sub driving current Ids, a light emission time, and the like, with deterioration data of the light emitting element. The deterioration data of the light emitting element may be stored in a memory such as a look up table. The deterioration value DET of the sub element group GRO may be extracted by substituting the value of the sub driving current Ids, the light emission time, and other data into an equation.

For example, referring to FIGS. 5 and 6, the deterioration value extractor 521 may extract a deterioration value DET1 of the first sub element group GRO1 according to the sub driving current Ids when the number NUM of light emitting elements of the first sub element group GRO1 is three. The deterioration value DET2 of the second sub element group GRO2 according to the sub driving current Ids may be extracted where the number NUM of light emitting elements of the second sub element group GRO2 is four. The deterioration value DETn of the n-th sub element group GROn according to the sub driving current Ids may be extracted where the number NUM of light emitting elements of the n-th sub element group GROn is k.

The luminance value calculator 522 may calculate the luminance value LUMI by applying the deterioration value DET. The luminance value LUMI may be calculated based on data on sub driving current Ids regarding the light emitting element, or may be calculated from an equation. The luminance value LUMI may be proportional to the value of the sub driving current Ids, but the luminance value LUMI may vary as the deterioration value DET is applied. For example, the sub driving current Ids of the first sub element group GRO1 may be greater than the sub driving current Ids of the second sub element group GRO2, but in case that the deterioration degree of the first sub element group GRO1 is greater than the deterioration degree of the second sub element group GRO2, the luminance value LUMI of the first sub element group GRO1 may be less than the luminance value LUMI of the second sub element group GRO2.

For example, referring to FIGS. 5 and 6, the luminance value calculator 522 may calculate a luminance value LUMI1 for the first sub element group GRO1 in which the deterioration value DET1 is applied, a luminance value LUMI2 for the second sub element group GRO2 in which the deterioration value DET2 is applied, and a luminance value LUMIn for the n-th sub element group GROn in which the deterioration value DETn is applied.

The correction luminance calculator 530 may receive the luminance value LUMI from the luminance value calculator 522, calculate a current luminance value LUMI_S of a pixel PX by summing the luminance value LUMI, and calculate a correction luminance value LUMI_C by comparing the current luminance value LUMI_S with a reference luminance value LUMI_R.

Referring to FIG. 7, the correction luminance calculator 530 may include a current luminance calculator 531 and a luminance comparator 532.

The current luminance calculator 531 may calculate the current luminance value LUMI_S of a pixel PX by summing the luminance value LUMI.

The current luminance calculator 531 may extract a deterioration weight DET_W according to a size and a distribution of the deterioration value DET of each sub element group GRO, and apply the extracted deterioration weight DET_W to the current luminance value LUMI_S.

For example, referring to FIG. 8, the current luminance calculator 531 may extract a deterioration weight DET_W of 7.7 for the first pixel PX1. For example, for the first pixel PX1, the deterioration value DET of the first sub element group GRO1 may be 9, the deterioration value DET of the second sub element group GRO2 may be 8, the deterioration value DET of the third sub element group GRO3 may be 7, and the deterioration value DET of the fourth sub element group GRO4 may be 6. The current luminance calculator 531 may apply the deterioration weight DET_W of 7.7 to the current luminance value LUMI_S of the first pixel PX1.

The current luminance calculator 531 may extract a deterioration weight DET_W of 10 for the second pixel PX2. For example, for the second pixel PX2, the deterioration value DET of the first sub element group GRO1 may be 15, the deterioration values DET of the second, third and fourth sub element groups GRO2, GRO3, and GRO4 may be 5. The current luminance calculator 531 may apply the deterioration weight DET_W of 10 to the current luminance value LUMI_S of the second pixel PX2.

The current luminance calculator 531 may extract the deterioration weight DET_W of 10.7 for the third pixel PX3. For example, for the third pixel PX3, the deterioration value DET of the first sub element group GRO1 may be 12, the deterioration value DET of the second sub element group GRO2 may be 11, the deterioration value DET of the third sub element group GRO3 may be 10, and the deterioration value DET of the fourth sub element group GRO4 may be 9. The current luminance calculator 531 may apply the deterioration weight DET_W of 10.7 to the current luminance value LUMI_S of the third pixel PX3.

The current luminance calculator 531 may extract the deterioration weight DET_W of 9.4 for the fourth pixel PX4. For example, for the fourth pixel PX4, the deterioration value DET of the first sub element group GRO1 may be 12, the deterioration value DET of the second sub element group GRO2 may be 10, the deterioration value DET of the third sub element group GRO3 may be 8, and the deterioration value DET of the fourth sub element group GRO4 may be 6. The current luminance calculator 531 may apply the deterioration weight DET_W of 9.4 to the current luminance value LUMI_S of the fourth pixel PX4.

Referring to FIG. 9, graph (a) of FIG. 9 shows the deviation of the luminance value LUMI when the number NUM of light emitting elements of the sub element groups GRO included in a light emitting unit EMU is similar, and graph (b) of FIG. 9 shows the deviation of the luminance value LUMI when the number of light emitting elements of the sub element groups GRO included in the light emitting unit EMU is significantly different.

The deviation of the luminance value LUMI shown in (b) of FIG. 9 has a value greater than that of the deviation of the luminance value LUMI shown in (a) of FIG. 9. For example, the deviation of the luminance value LUMI occurs according to the number NUM of light emitting elements included in the sub element group GRO.

Accordingly, in an embodiment, as described above with reference to FIG. 8, when the deterioration weight DET_W according to the size and the distribution of the deterioration value DET of the sub element groups GRO included in the light emitting unit EMU is applied, the luminance may be corrected by applying the deterioration degree of the sub element group GRO with a reference value, and a uniform luminance may be implemented between the pixels PX.

The luminance comparator 532 may calculate the correction luminance value LUMI_C by comparing the current luminance value LUMI_S with the reference luminance value LUMI_R.

For example, in case that the current luminance value LUMI_S is greater than the reference luminance value LUMI_R, the luminance comparator 532 may calculate a negative correction luminance value LUMI_C, and in case that the current luminance value LUMI_S is less than the reference luminance value LUMI_R, the luminance comparator 532 may calculate a positive correction luminance value LUMI_C.

The correction luminance calculator 530 may calculate the correction luminance value LUMI_C while considering the change in efficiency of the light emitting element LD over time.

For example, FIG. 10 describes the case where there is one sub element group GRO.

As time passes, the current luminance value of the light emitting elements LD may decrease. For example, light emission efficiency of the light emitting elements LD may decrease over time, and the correction luminance calculator 530 may calculate the correction luminance value LUMI_C by comparing the current luminance value LUMI1_S with the reference luminance value LUMI_R at a first time t1a and a second time t2a.

A luminance value LUMI1_S of the sub element group may gradually decrease, and the luminance value LUMI1_S of the sub element group may be corrected to the reference luminance value LUMI_R at the first time t1a. Here, the correction luminance value LUMI_C to be corrected to the reference luminance value LUMI_R may correspond to ΔXa.

Thereafter, the luminance value LUMI1_S of the first sub element group may gradually decrease, and the luminance value LUMI1_S of the first sub element group may be corrected to the reference luminance value LUMI_R at the second time t2a. Here, the correction luminance value LUMI_C to be corrected to the reference luminance value LUMI_R may correspond to ΔXb.

As the luminance value LUMI1_S of the first sub element group is corrected, an absolute value of the correction luminance value LUMI_C may gradually decrease. Accordingly, in an embodiment, the luminance of the display device may be corrected to be uniform over time, and luminance reliability may be improved.

In another example, FIG. 11 describes a case where there are three sub element groups GRO.

The correction luminance calculator 530 may calculate the correction luminance value LUMI_C by comparing current luminance values LUMI1_S, LUMI2_S, and LUMI3_S with the reference luminance value LUMI_R at the first time t1b and the second time t2b. Here, the number NUM of light emitting elements of the first sub element group GRO1 may be greater than the number NUM of light emitting elements of the second sub element group GRO2 and the third sub element group GRO3. The number NUM of light emitting elements of the second sub element group GRO2 may be greater than the number NUM of light emitting elements of the third sub element group GRO3.

The luminance values LUMI1_S, LUMI2_S, and LUMI3_S of the first, second, and third sub element groups GRO1, GRO2, and GRO3 may gradually decrease, and the luminance values LUMI1_S, LUMI2_S, and LUMI3_S of the first, second, and third sub element groups may be corrected to the reference luminance value LUMI_R at the first time t1b. Here, the luminance correction value LUMI_C to be corrected to the reference luminance value LUMI_R may correspond to ΔXc.

Thereafter, the luminance values LUMI1_S, LUMI2_S, and LUMI3_S of the first, second, and third sub element groups may gradually decrease, and the luminance values LUMI1_S, LUMI2_S, and LUMI3_S of the first, second, and third sub element groups may be corrected to the reference luminance value LUMI_R at the second time t2b. Here, the luminance correction value LUMI_C to be corrected to the reference luminance value LUMI_R may correspond to ΔXd.

As the luminance values LUMI1_S, LUMI2_S, and LUMI3_S of the first, second, and third sub element groups are corrected, the absolute value of the correction luminance value LUMI_C may gradually decrease. Accordingly, in an embodiment, the luminance of the display device may be corrected to be uniform over time, and luminance reliability may be improved.

The corrector 540 may receive the correction luminance value LUMI_C from the correction luminance calculator 530, receive the image data DATA1 from the timing controller 400 (refer to FIG. 1), and generate the compensation data CDATA in which the correction luminance value LUMI_C is reflected. The corrector 540 may provide the compensation data CDATA to the data driver 300 (refer to FIG. 1).

Hereinafter, a method of driving a display device according to an embodiment is described with reference to FIG. 12.

Figure 12:
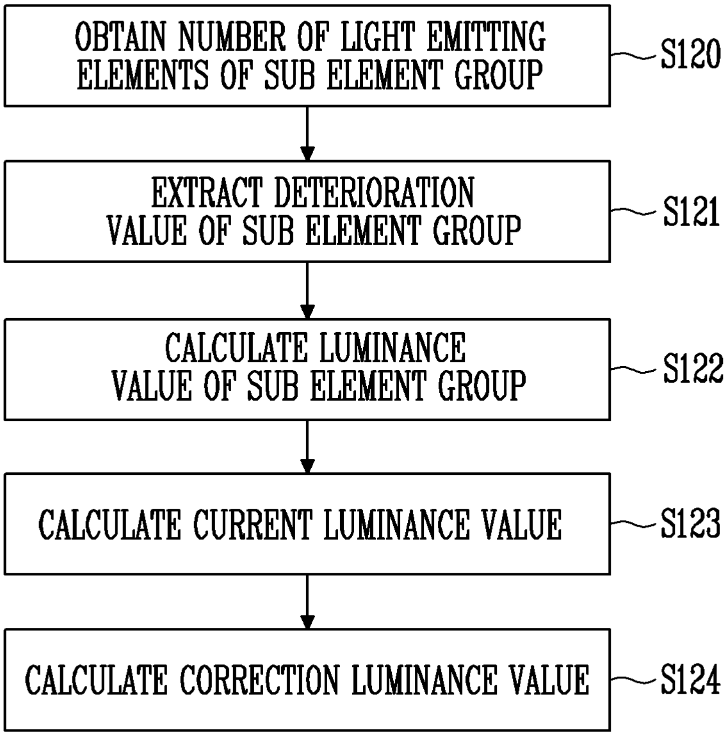
FIG. 12 is a flowchart illustrating a method of driving a luminance corrector in a display device according to an embodiment.

FIG. 12 is a flowchart illustrating a method of driving a luminance corrector in a display device according to an embodiment.

Referring to FIG. 12, in an embodiment, the display device driven by a luminance corrector may correct the luminance of the display device. Hereinafter, the disclosure is described with reference to FIGS. 1 to 11 together.

The light emitting element number obtainer 510 may obtain the number NUM of light emitting elements in each of the sub element groups GRO included in the light emitting unit EMU (S120).

The deterioration value extractor 521 may extract the deterioration value of the sub element groups GRO according to the sub driving current Ids applied to each light emitting element LD of the sub element group GRO. The sub driving current Ids may be obtained by dividing the driving current Id applied to the light emitting unit EMU by the number of the light emitting elements (S121).

Thereafter, the luminance value calculator 522 may calculate the luminance value LUMI by applying the deterioration value DET (S122).

The current luminance calculator 531 may calculate the current luminance value LUMI_S of a pixel PX by summing the luminance value LUMI (S123). The current luminance calculator 531 may extract the deterioration weight DET_W according to the magnitude and the distribution of the deterioration values DET of each sub element group GRO, and apply the extracted deterioration weight DET_W to the current luminance value LUMI_S.

The luminance comparator 532 may calculate the correction luminance value LUMI_C by comparing the current luminance value LUMI_S with the reference luminance value LUMI_R (S124).

The corrector 540 may receive the correction luminance value LUMI_C from the luminance comparator 532, receive the image data DATA1 from the timing controller 400 (refer to FIG. 1), and generate the compensation data CDATA in which the correction luminance value LUMI_C is reflected. The corrector 540 may provide the compensation data CDATA to the data driver 300 (refer to FIG. 1).

Accordingly, in an embodiment, since the luminance of the pixels PX is corrected according to the deterioration degree based on the number of light emitting elements in each sub element group GRO, the luminance of the display device may be uniformly maintained.

Hereinafter, a light emitting element included in a display device according to an embodiment is described with reference to FIG. 13.

Figure 13:
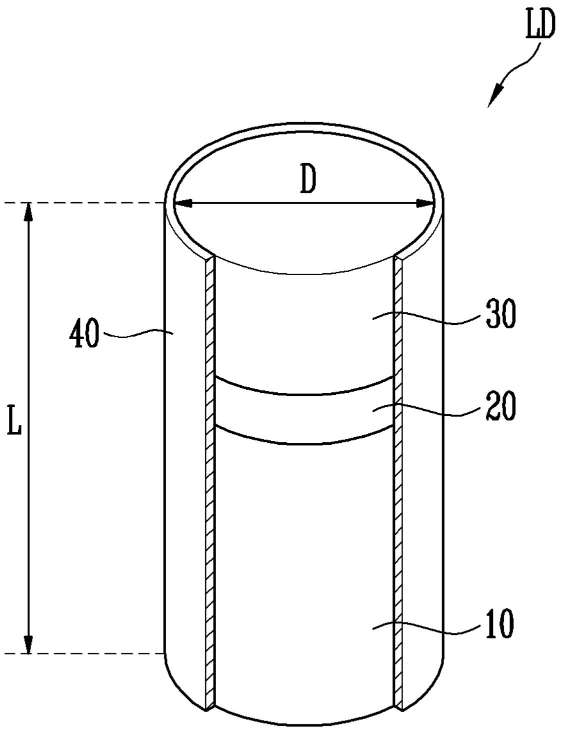
FIG. 13 is a perspective view illustrating a light emitting element according to an embodiment.

FIG. 13 is a perspective view illustrating a light emitting element according to an embodiment.

Referring to FIG. 13, the light emitting element LD included in the display device according to an embodiment includes a first semiconductor layer 10, a second semiconductor layer 30, and an active layer 20 disposed between the first semiconductor layer 10 and the second semiconductor layer 30. For example, the light emitting element LD may be configured as a stack in which the first semiconductor layer 10, the active layer 20, and the second semiconductor layer 30 are sequentially stacked along a length L direction.

The light emitting element LD may be provided in a rod shape extending in one direction, for example, a cylinder shape. In case that the extension direction of the light emitting element LD is referred to as the length L direction, the light emitting element LD may have a side end portion and another side end portion along the length L direction. Although FIG. 13 shows a light emitting element of a column shape, the type and/or shape of the light emitting element is not limited thereto.

The light emitting element LD may be a rod-shaped light emitting diode manufactured in a rod shape. In the specification, the term "rod-shaped" encompasses a rod-like shape or a bar-like shape that is long (for example, having an aspect ratio greater than 1) in the length L direction, such as a circular column or a polygonal column, and a shape of a cross section thereof is not particularly limited. For example, a length L of the light emitting element LD may be greater than a diameter D (or a width of the cross section). However, the disclosure is not limited thereto, and according to an embodiment, the light emitting element LD may have a rod-like shape or a bar-like shape that is short in the length L direction (for example, having an aspect ratio less than 1). In other embodiments, the light emitting element LD may have a rod-like shape or a bar-like shape in which the length L and the diameter D are identical.

The light emitting element LD may have a size in a nanometer to a micrometer range. Each light emitting element LD may have a diameter D and/or a length L in a nanometer to a micrometer range. The size of the light emitting element LD may be changed according to design conditions of various devices using a light emitting device that uses the light emitting element LD as a light source, for example, a display device or the like.

The first semiconductor layer 10 may include at least one n-type semiconductor layer. For example, the first semiconductor layer 10 may include at least one semiconductor material from InAlGaN, GaN, AlGaN, InGaN, AlN, and InN, and may include an n-type semiconductor layer doped with a first conductive dopant such as Si, Ge, or Sn. However, the material for the first semiconductor layer 10 is not limited thereto, and various other materials may be used for the first semiconductor layer 10.

The active layer 20 may be disposed on the first semiconductor layer 10 and may be formed in a single or multiple quantum well structure. In an embodiment, a clad layer doped with a conductive dopant may be formed on and/or under the active layer 20. For example, the clad layer may be formed of an AlGaN layer or an InAlGaN layer. According to an embodiment, a material such as AlGaN or InAlGaN may be used to form the active layer 20, and various other materials may be used in the active layer 20.

When a voltage equal to or greater than a threshold voltage is applied to the ends of the light emitting element LD, the light emitting element LD emits light while electron-hole pairs are combined in the active layer 20. By controlling the light emission of the light emitting element LD using such a principle, the light emitting element LD may be used as a light source for light emitting devices such as the pixel of a display device.

The second semiconductor layer 30 may be disposed on the active layer 20 and may include a semiconductor layer of a type different from that of the first semiconductor layer 10. For example, the second semiconductor layer 30 may include at least one p-type semiconductor layer. For example, the second semiconductor layer 30 may include at least one semiconductor material from InAlGaN, GaN, AlGaN, InGaN, AlN, and InN, and may include a p-type semiconductor layer doped with a second conductive dopant such as Mg, Zn, Ca, Sr, or Ba. However, the material for the second semiconductor layer 30 is not limited thereto, and various other materials may be used for the second semiconductor layer 30.

In an embodiment, each of the first semiconductor layer 10 and the second semiconductor layer 30 is made of a single layer, but the disclosure is not limited thereto. In an embodiment, according to the material of the active layer 20, each of the first semiconductor layer 10 and the second semiconductor layer 30 may further include one or more layers, for example, a clad layer and/or a tensile strain barrier reducing (TSBR) layer. The TSBR layer may be a strain alleviating layer disposed between semiconductor layers in which lattice structures are different to serve as a buffer for reducing a lattice constant difference. The TSBR layer may use a p-type semiconductor layer such as p-GaInP, p-AlInP, or p-AlGaInP, but the disclosure is not limited thereto.

According to an embodiment, the light emitting element LD may further include an insulating layer 40 provided on a surface. The insulating layer 40 may be formed on the surface of the light emitting element LD to surround an outer circumferential surface of the active layer 20, and may further surround a region of the first semiconductor layer 10 and the second semiconductor layer 30. However, according to an embodiment, the insulating layer 40 may expose both ends of the light emitting element LD having different polarities. For example, the insulating layer 40 may not cover and may expose an end of each of the first semiconductor layer 10 and the second semiconductor layer 30. The portion not covered may be the ends of the light emitting element LD in the length L direction, for example, both of the bottom surfaces of the cylinder (an upper surface and a lower surface of the light emitting element LD).

When the insulating layer 40 is provided on a surface of the light emitting element LD, for example, the surface of the active layer 20, the active layer 20 may be prevented from being short-circuited with electrodes or the like. For example, a short circuit may be prevented between the active layer and the contact electrodes (not shown) connecting the ends of the light emitting element LD. Accordingly, electrical stability of the light emitting element LD may be secured.

As the light emitting element LD includes the insulating layer 40 on the surface thereof, surface defects in the light emitting element LD may be minimized, and thus the lifespan and efficiency may be improved. In case that the light emitting element LD includes the insulating layer 40, even though light emitting elements LD are disposed close to each other, occurrence of unwanted short circuits between the light emitting elements LD may be prevented.

In an embodiment, the light emitting element LD may be manufactured through a surface treatment process. For example, the surface treatment may be performed on each light emitting element LD so that when light emitting elements LD are mixed in a fluid solution (or solvent) and supplied to emission areas (for example, an emission area of each pixel), the light emitting elements LD may be uniformly dispersed in the solution rather than clumping unevenly in the solution.

In an embodiment, the light emitting element LD may further include additional components in addition to the first semiconductor layer 10, the active layer 20, the second semiconductor layer 30, and the insulating layer 40. For example, the light emitting element LD may additionally include one or more phosphor layers, active layers, semiconductor layers and/or electrodes disposed on an end side of the first semiconductor layer 10, the active layer 20, and the second semiconductor layer 30.

The light emitting element LD may be used in various types of devices requiring a light source, including a display device. For example, at least one light emitting element LD, for example, light emitting elements LD each having a size in the range of nanometers to micrometer, may be disposed in each pixel area of the display device, and the light emitting elements LD may be used as a light source (or a light source unit) of each pixel. However, in the disclosure, the application field of the light emitting element LD is not limited to the display device. For example, the light emitting element LD may be used in other types of devices requiring a light source, such as a lighting device.

Embodiments have been disclosed herein, and although terms are employed, they are used and are to be interpreted in a generic and descriptive sense only and not for purpose of limitation. In some instances, as would be apparent by one of ordinary skill in the art, features, characteristics, and/or elements described in connection with an embodiment may be used singly or in combination with features, characteristics, and/or elements described in connection with other embodiments unless otherwise specifically indicated. Accordingly, it will be understood by those of ordinary skill in the art that various changes in form and details may be made without departing from the spirit and scope of the disclosure as set forth in the following claims.

What is claimed is:

1. A display device comprising:

a pixel including a light emitting unit, wherein the light emitting unit includes at least one sub element group, the at least one sub element group includes a first sub element group and a second sub element group electrically connected in series, and each of the first and second sub element groups includes a plurality of light emitting elements electrically connected in parallel;

a data driver that supplies a data voltage to the pixel; and a luminance corrector that corrects image data and generates compensation data corresponding to the data voltage, wherein a number of the light emitting elements of each of the first and second sub element groups is obtained by at least one of optical imaging, thermal imaging, and pixel sensing, and the luminance corrector extracts a deterioration value of the at least one sub element group and calculates a luminance value of the at least one sub element group according to a number of the light emitting elements included in the at least one sub element group using a look up table that stores a deterioration value for each number of the light emitting elements.

2. The display device according to claim 1, wherein the luminance corrector extracts the deterioration value of the at least one sub element group according to a sub driving current applied to each of the light emitting elements, the sub driving current of each of the light emitting elements corresponds to a driving current applied to the light emitting unit by the number of the light emitting elements included in the at least one sub element group, and the luminance corrector calculates the luminance value of the at least one sub element group by applying the deterioration value the at least one sub element group.

3. The display device according to claim 2, wherein the luminance corrector calculates a current luminance value of the pixel by summing the luminance value of each of the at least one sub element group, and the luminance corrector calculates a correction luminance value by comparing the current luminance value with a reference luminance value.

4. The display device according to claim 3, wherein the luminance corrector extracts a deterioration weight according to magnitudes of the deterioration value of the at least one sub element group and a distribution of the deterioration value of the at least one sub element group, and applies the deterioration weight to the current luminance value.

5. The display device according to claim 3, wherein the luminance corrector generates the compensation data by applying the correction luminance value to the image data.

6. The display device according to claim 5, further comprising:

a timing controller that supplies the image data to the luminance corrector, wherein an externally supplied image signal is rearranged in the image data, and the luminance corrector supplies the compensation data to the data driver.

7. The display device according to claim 1, wherein the pixel comprises:

a first transistor including a first electrode electrically connected to a first power line, a second electrode electrically connected to a first electrode of the light emitting unit, and a gate electrode electrically connected to a first node;

a second transistor including a first electrode electrically connected to a data line, a second electrode electrically connected to the first node, and a gate electrode electrically connected to a first scan line; and a third transistor including a first electrode electrically connected to a sensing line, a second electrode electrically connected to the second electrode of the first transistor, and a gate electrode electrically connected to a second scan line, and the first transistor controls a value of a driving current flowing to the light emitting unit in response to a voltage of the first node.

8. The display device according to claim 1, wherein the number of the light emitting elements of the first sub element group and the number of the light emitting elements of the second sub element group are different, and a value of a sub driving current applied to each of the light emitting elements of the first sub element group and a value of a sub driving current applied to each of the light emitting elements of the second sub element group are different.

9. The display device according to claim 8, wherein in case that the number of the light emitting elements of the first sub element group is less than the number of the light emitting elements of the second sub element group, the value of the sub driving current applied to each of the light emitting elements of the first sub element group is greater than the value of the sub driving current applied to each of the light emitting elements of the second sub element group.

10. The display device according to claim 1, the pixel further comprising:

a driving transistor that supplies a driving current to the light emitting unit, the driving transistor being electrically connected between a first driving voltage and the light emitting unit, the light emitting unit being electrically connected between the driving transistor and a second driving voltage.

11. A display device comprising:

a pixel including a light emitting unit including sub element groups electrically connected in series, each sub element group including light emitting elements electrically connected in parallel;

a deterioration value extractor that extracts deterioration values of the sub element groups according to a number of the light emitting elements of the each sub element group using a look up table that stores a deterioration value for each number of the light emitting elements, wherein the number of the light emitting elements of the each sub element group is obtained by at least one of optical imaging, thermal imaging, and pixel sensing;

a luminance value calculator that calculates luminance values of the sub element groups by applying the deterioration values;

a correction luminance calculator that calculates a current luminance value of the pixel by summing the luminance values, and calculates a correction luminance value by comparing the current luminance value with a reference luminance value; and a corrector that generates compensation data by applying the correction luminance value to image data.

12. The display device according to claim 11, further comprising:

a data driver that supplies a data voltage to the pixel; and a timing controller that supplies the image data to the corrector, wherein an externally supplied image signal is rearranged in the image data, and the corrector supplies the compensation data to the data driver.

13. The display device according to claim 11, wherein the correction luminance calculator extracts a deterioration weight according to magnitudes of the deterioration values of the sub element groups and a distribution of the deterioration values of the sub element groups, and applies the deterioration weight to the current luminance value.

14. The display device according to claim 11, wherein the correction luminance calculator calculates the correction luminance value by considering a change in efficiency of the light emitting elements of the sub element groups over time.

15. A method of driving a display device, the method comprising:

providing a pixel that includes a light emitting unit electrically connected between a driving transistor and a voltage source, the light emitting unit including a plurality of sub element groups electrically connected in series, wherein each sub element group includes a plurality of light emitting elements electrically connected in parallel;

obtaining a number of the light emitting elements of each of the sub element groups by at least one of optical imaging, thermal imaging, and pixel sensing;

extracting deterioration values of the sub element groups using a look up table that stores a deterioration value for each number of the light emitting elements;

calculating luminance values of the sub element groups by applying the deterioration values;

calculating a current luminance value of the pixel by summing the luminance values; and calculating a correction luminance value by comparing the current luminance value with a reference luminance value.

16. The method according to claim 15, wherein the calculating of the current luminance value of the pixel includes:

extracting a deterioration weight according to magnitudes and a distribution of the deterioration values of the sub element groups, and applying the deterioration weight to the current luminance value.

17. The method according to claim 15, wherein the calculating of the correction luminance value includes considering a change in efficiency of the light emitting elements over time.

18. The method according to claim 15, further comprising:

generating compensation data by applying the correction luminance value to image data, wherein an externally supplied image signal is rearranged in the image data.

* * * * *